United States Patent
Sugiyama

[11] 4,217,034
[45] Aug. 12, 1980

[54] RETROFOCUS TYPE WIDE ANGLE PHOTOGRAPHIC LENS

[75] Inventor: Takahiro Sugiyama, Tokyo, Japan

[73] Assignee: Asahi Kogaku Kogyo Kabushiki Kaisha, Tokyo, Japan

[21] Appl. No.: 2,135

[22] Filed: Jan. 9, 1979

[30] Foreign Application Priority Data

Jan. 27, 1978 [JP] Japan .................................. 53-8001

[51] Int. Cl.² ............................................ G02B 13/04
[52] U.S. Cl. ................................................. 350/214
[58] Field of Search ......................................... 350/214

[56] References Cited
U.S. PATENT DOCUMENTS 4,062,622  12/1977  Sugiyama ........................... 350/214

*Primary Examiner*—Conrad J. Clark
*Attorney, Agent, or Firm*—Sughrue, Rothwell, Mion, Zinn and Macpeak

[57] ABSTRACT

A retrofocus type wide angle photographic lens is disclosed comprising eight lens elements grouped into eight lens components. The lens has an aperture ratio 1:2.5 and a viewing angle of 85°.

3 Claims, 6 Drawing Figures

RETROFOCUS TYPE WIDE ANGLE PHOTOGRAPHIC LENS

BACKGROUND OF THE INVENTION

This invention relates to a retrofocus type wide angle photographic lens having an aperture ratio of 1:2.5, a view angle of 85° and backfocal length which is 1.5 times of the overall focal length sufficient to be mountable on an SLR (single lens reflex) camera, in which various aberrations are well compensated for.

A specific lens construction according to the present invention will be described herein. In the prior art various lens constructions for wide angle lenses are known. A lens construction disclosed in U.S. Pat. No. 4,062,622 has some similarities to that of the present invention and relates to a lens construction having an aperture ratio of 1:4.0 and a viewing angle of 95°. The present invention relates to a lens construction having an aperture ratio of 1:2.5 and a viewing angle of 85°. That is, in the present invention, although the view angle is somewhat narrowed, the aperture ratio is remarkably advanced. In this case, since the view angle is made small, astigmatism and distortion is compensated for with ease and it is also available to obtain a sufficient backfocal length.

However, since the aperture ratio is increased, it is difficult to compensate for spherical aberration and coma aberration. Unless the lens power arrangement is widely varied, it is difficult to compensate for the various aberrations with good balance. However, the present invention provides a lens system in which these aberrations are compensated for with good balance. As indicated, the present invention is an improvement on the U.S. Pat. No. 4,062,622 that realizes a lens system on the basis of another conception of lens design.

SUMMARY OF THE INVENTION

Accordingly, it is an object of this invention to provide a retrofocus wide angle lens having superior performance capabilities.

Yet another object of this invention is to provide a retrofocus wide angle lens in which various optical aberrations are well compensated for with good balance.

A further object of this invention is to provide a retrofocus wide angle lens that is economically manufactured.

The lens system has eight elements grouped into eight components. A first lens component is a positive lens. Second and third lens components are negative meniscus lenses each having a convex surface directed to the object side. Fourth and fifth lens components are positive lenses, respectively. A sixth lens component is a negative lens. Seventh and eighth lens components are positive lenses. A stop diaphragm is interposed between the fourth and fifth lens components.

DETAILED DESCRIPTION OF THE PREFERRED EMBODIMENT

Figure 1:
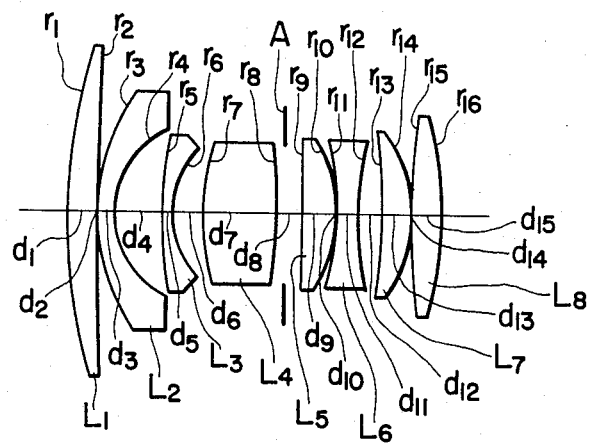
FIG. 1 shows a lens construction according to Example 1.
Figure 3:
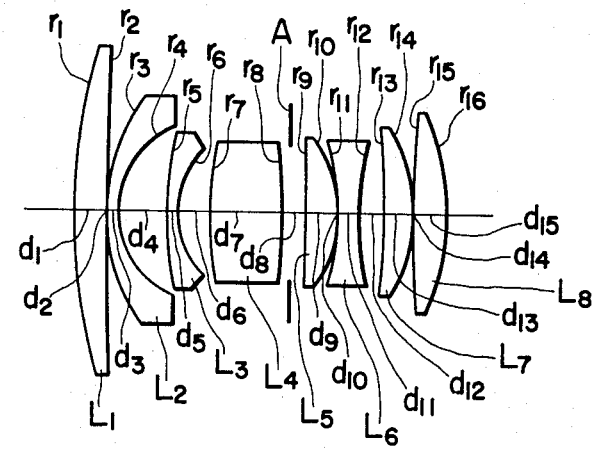
FIG. 3 is shows a lens construction according to Example 2.
Figure 5:
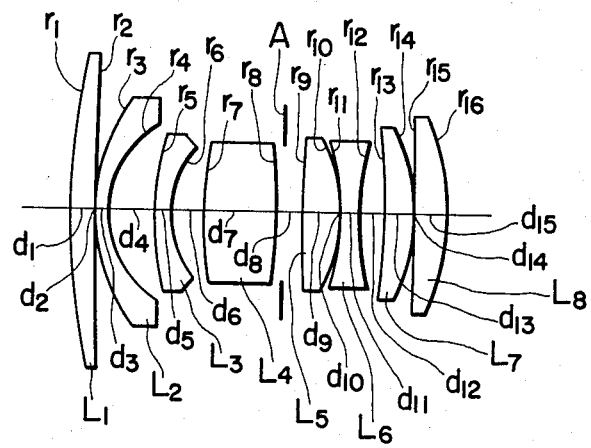
FIG. 5 shows a lens construction according to Example 5.

Referring now to the lens constructions according to Examples 1 to 3, shown in FIGS. 1, 3 and 5, respectively, the individual lens elements are positioned along the optical axis. The lenses are shown such that the object side is on the left and the image side is on the right. The lens surfaces are designated by $r_1, r_2, r_3, \ldots, r_{16}$ and the distance between any two surfaces along the optical axis is designated by $d_j$, where $d_j$ is the distance between surfaces $r_j$ and $r_{j+1}$.

The lens system has eight lens elements grouped into eight components. The first lens $L_1$ is a positive lens. The second and third lenses $L_2$ and $L_3$ are negative meniscus lenses each having a convex surface directed to the object. The fourth and fifth lenses $L_4$ and $L_5$ are positive lenses, respectively. The sixth lens $L_6$ is a negative lens. The seventh and eight lenses $L_7$ and $L_8$ are positive lenses. A stop diaphragm A is disposed between the lenses $L_4$ and $L_5$.

The photographic lens of the above described construction is specifically designed to satisfy the following conditions:

$$\bar{\nu} > 50 \tag{1}$$
$$\frac{F}{1.7} < |F_{1 \cdot 2 \cdot 3}| < \frac{F}{1.0}, F_{1 \cdot 2 \cdot 3} < 0 \tag{2}$$
$$|F_{1 \cdot 2 \cdot 3 \cdot 4}| < \frac{F}{0.4} \tag{3}$$
$$\frac{F}{1.1} < |F_{1 \cdot 2 \cdot 3 \cdot 4 \cdot 5 \cdot 6}| < \frac{F}{0.5}, \tag{4}$$
$$F_{1 \cdot 2 \cdot 3 \cdot 4 \cdot 5 \cdot 6} < 0$$
$$1.5F < \Sigma_d < 2.2F \tag{5}$$

where
f is the overall focal length;
$F_{1 \cdot 2 \cdots i}$ is resultant focal length from the first lens $L_1$ to the i-th lens $L_i$;
$r_j$ is the radius of curvature of the j-th lens surface;
$d_j$ is the lens thickness or the air gap between the j-th surface and the (j+1)-th lens surface;
$n_k$ is the refractive index of the k-th lens;
$\nu_k$ is the Abbe number of the k-th lens;
$\bar{\nu}$ is the average Abbe number of the first, second and third lenses $L_1$, $L_2$ and $L_3$; and
$\Sigma_d$ is the overall length of the lens system.

The conditions will now be individually explained in deatil.

Condition (1) of $\bar{\nu} > 50$ is required to reduce chromatic aberration of magnification due to incidental light fluxes having a large viewing angle and a small viewing angle to the lens system. In a wide viewing angle lens, the condition of the generated chromatic aberration of magnification is varied depending on the variation of the incidental angle. The focussing ability deteriorates and this must be, therefore, eliminated. Since incidental heights of respective lenses positioned especially to third lens are high, chromatic aberration will be inherently generated. If $\bar{\nu} > 50$ is established, the chromatic aberration generated to the third lens $L_3$ is extremely compensated for with the lenses disposed after the fourth lens $L_4$. This leads to difficulty to compensate for chromatic aberration. Condition (2) of $$\frac{F}{1.7} < |F_{1\cdot2\cdot3}| < \frac{F}{1.0}, F_{1\cdot2\cdot3} < 0$$

is important to obtain a suitable backfocal length. When the lower limit of F/1.7 is exceeded, though available to obtain the suitable backfocal length, Petzval's sum is reduced. This disadvantageously causes the generation of astigmatism and negative distortion. Conversely, when the upper limit of F/1.0 is exceeded, though available to compensate for astigmatism, distortion and the like, it is difficult to obtain the suitable backfocal length.

Condition (3) of $$|F_{1\cdot2\cdot3\cdot4}| < \frac{F}{0.4}$$

is required to determine the focal length of the fourth lens component $L_4$ and to obtain the suitable backfocal length, cooperating with conditions (2) and (4). When $F_{1\cdot2\cdot3\cdot4}$ is positive and larger than F/0.4, it becomes difficult to obtain the suitable backfocal length. Hence, it is desirable to reduce $|F_{1\cdot2\cdot3}|$ and $|F_{1\cdot2\cdot3\cdot4\cdot5\cdot6}|$ to further shorten focal lengths cooperating with conditions (2) and (4). However, this causes deterioration of astigmatism and coma aberration. Conversely, when $F_{1\cdot2\cdot3\cdot4}$ is negative and larger than F/0.4 in its absolute value, though available to obtain the suitable backfocal length, the optical load is on the positive lenses disposed after the fifth lens component. This causes undesirable destruction of the aberration balance.

Condition (4) of $$\frac{F}{1.1} < |F_{1\cdot2\cdot3\cdot4\cdot5\cdot6}| < \frac{F}{0.5},$$

$F_{1\cdot2\cdot3\cdot4\cdot5\cdot6} < 0$ is required to obtain a sufficient backfocal length with good compensation of the coma aberration. When $|F_{1\cdot2\cdot3\cdot4\cdot5\cdot6}|$ is smaller than F/1.1, though available to obtain a sufficient backfocal length, the focal lengths of the seventh and eighth lens components are shortened so that the coma aberration and the spherical aberration increase. Conversely, when the upper limit of F/0.5 is exceeded, in order to obtain a sufficient backfocal length, the focal length of the eighth lens component $L_8$ must be shortened by elongation of the seventh lens component $L_7$ or otherwise the lens thicknesses/air gaps of the lenses having divergent light fluxes and disposed after the sixth lens component $L_6$ must be widened. Such methods can be considered. However, in the former, it is difficult to compensate for spherical aberration and coma aberration with good balance, and in the latter, the overall focal length of the lens system is elongated. Both methods are accordingly deemed inadequate.

Condition (5) of $1.5 F < \Sigma_d < 2.2 F$ is required to miniaturize the lens system. When $\Sigma_d$ exceeds the upper limit of 2.2 F, it is undesirable because the lens system is unduly enlarged. Conversely, when the lower limit of 1.5 F is exceeded, the end thickness of the lenses are smaller than required and as a result it is impossible to produce such lenses.

By satisfying the above described conditions a retrofocus wide angle photographic lens having a sufficient backfocus, an aperture ratio of 1:2.5 and a view angle of 85° with good aberration compensation can be obtained.

Figure 2:
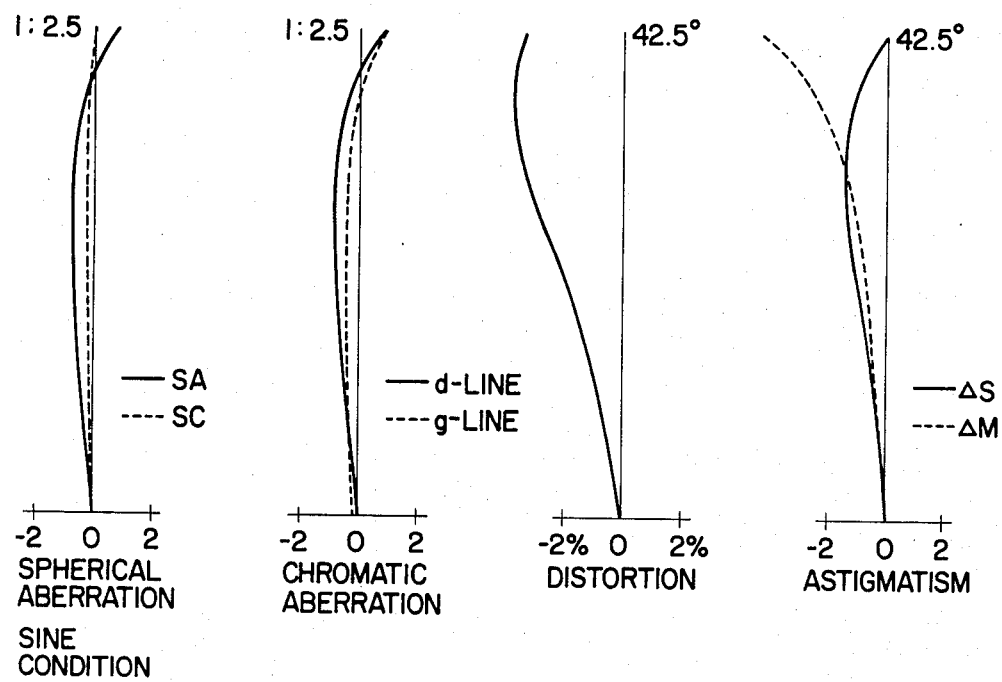
FIG. 2 is graphs showing various aberration curves of the lens construction shown in FIG. 1.
Figure 4:
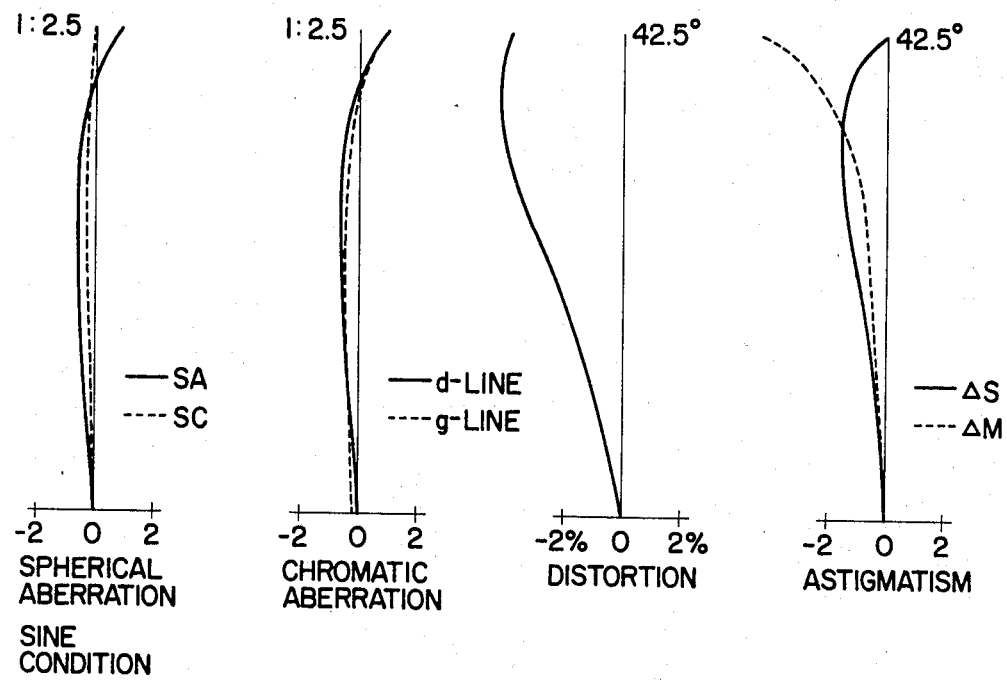
FIG. 4 is graphs showing various aberration curves of the lens construction shown in FIG. 3.
Figure 6:
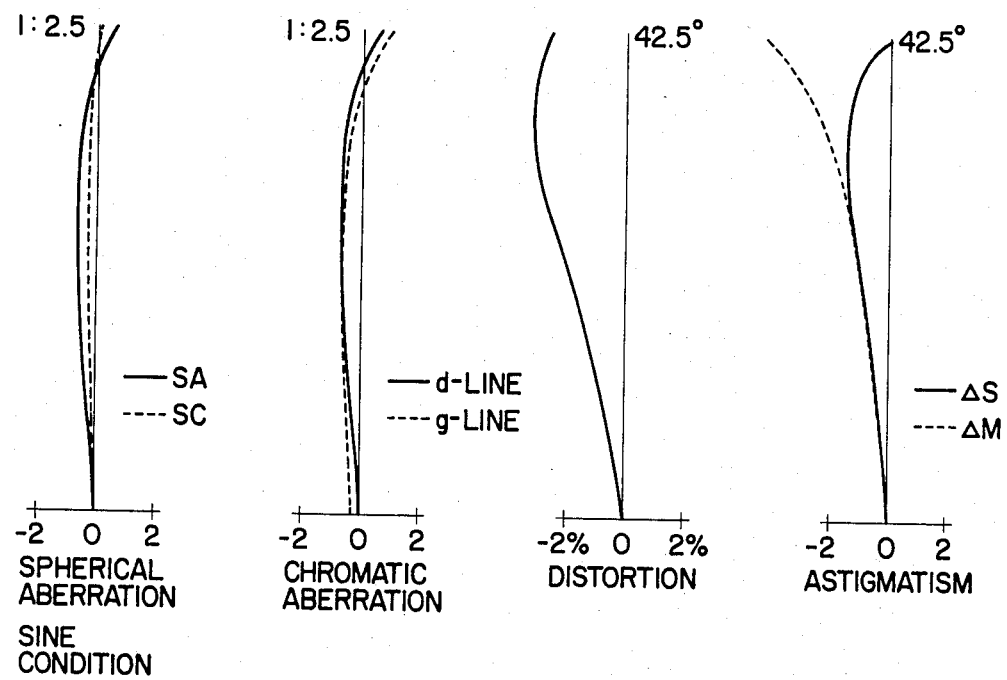
FIG. 6 is graphs showing various aberration curves of the lens construction shown in FIG. 5.

The specific parameters for Examples 1 to 3 are given below. In the Examples, all linear dimensions are numerals such that the overall focal length F is estimated as 100. The aberration curves resulting from lenses according to Examples 1 to 3 are shown in FIGS. 2, 4 and 6, respectively.

EXAMPLE 1

| overall focal length F = 100 | aperture ratio 1:2.5 | | viewing angle 85° |
|---|---|---|---|
| radius of curvature | thickness or space | refractive index | Abbe number |
| $L_1 \begin{cases} r_1 = 276.34 \\ r_2 = 1748.71 \end{cases}$ | $d_1 = 13.26$ $d_2 = 0.41$ | $n_1 = 1.51633$ | $\nu_1 = 64.1$ |
| $L_2 \begin{cases} r_3 = 93.95 \\ r_4 = 42.38 \end{cases}$ | $d_3 = 7.19$ $d_4 = 22.69$ | $n_2 = 1.51112$ | $\nu_2 = 60.5$ |
| $L_3 \begin{cases} r_5 = 201.92 \\ r_6 = 42.00 \end{cases}$ | $d_5 = 4.90$ $d_6 = 14.98$ | $n_3 = 1.51454$ | $\nu_3 = 54.7$ |
| $L_4 \begin{cases} r_7 = 116.47 \\ r_8 = -208.58 \end{cases}$ | $d_8 = 34.93$ $d_8 = 11.87$ | $n_4 = 1.74077$ | $\nu_4 = 27.8$ |
| $L_5 \begin{cases} r_9 = -1869.36 \\ r_{10} = -66.96 \end{cases}$ | $d_9 = 16.04$ $d_{10} = 0.57$ | $n_5 = 1.58913$ | $\nu_5 = 61.1$ |
| $L_6 \begin{cases} r_{11} = -118.34 \\ r_{12} = 139.95 \end{cases}$ | $d_{11} = 10.88$ $d_{12} = 9.64$ | $n_6 = 1.80518$ | $\nu_6 = 25.4$ |
| $L_7 \begin{cases} r_{13} = -360.80 \\ r_{14} = -66.60 \end{cases}$ | $d_{13} = 14.03$ $d_{14} = 0.41$ | $n_7 = 1.51633$ | $\nu_7 = 64.1$ |
| $L_8 \begin{cases} r_{15} = 402.67 \\ r_{16} = -157.14 \end{cases}$ | $d_{15} = 13.08$ | $n_8 = 1.51633$ | $\nu_8 = 64.1$ |

Backfocus = 156.241 = 1.56 F $$F_{1\cdot2\cdot3} = -67.422 = -\frac{F}{1.48}$$

$$F_{1\cdot2\cdot3\cdot4} = -605.804 = -\frac{F}{0.17}$$

$$F_{1\cdot2\cdot3\cdot4\cdot5\cdot6} = -133.808 = -\frac{F}{0.75}$$

$\overline{\nu} = 59.8$
$\Sigma_d = 174.87 = 1.75$ F
Petzval's sum = 0.151

EXAMPLE 2

| overall focal length F = 100 | aperture ratio 1 : 2.5 | | viewing angle 85° |
|---|---|---|---|
| radius of curvature | thickness or space | refractive index | Abbe number |
| $L_1 \begin{cases} r_1 = 264.57 \\ r_2 = 2056.82 \end{cases}$ | $d_1 = 15.21$ $d_2 = 0.41$ | $n_1 = 1.51633$ | $\nu_1 = 64.1$ |
| $L_2 \begin{cases} r_3 = 92.90 \\ r_4 = 42.10 \end{cases}$ | $d_3 = 4.97$ $d_4 = 22.37$ | $n_2 = 1.51633$ | $\nu_2 = 64.1$ |
| $L_3 \begin{cases} r_5 = 157.49 \\ r_6 = 40.58 \end{cases}$ | $d_5 = 5.21$ $d_6 = 14.59$ | $n_3 = 1.51633$ | $\nu_3 = 64.1$ |

-continued

| overall focal length F = 100 | aperture ratio 1 : 2.5 | viewing angle 85° | |
|---|---|---|---|
| radius of curvature | thickness or space | refractive index | Abbe number |
| $L_4$ { $r_7 = 125.82$ <br> $r_8 = -315.39$ | $d_7 = 33.51$ <br> $d_8 = 11.17$ | $n_4 = 1.80518$ | $\nu_4 = 25.8$ |
| $L_5$ { $r_9 = 2718.88$ <br> $r_{10} = -58.89$ | $d_9 = 15.01$ <br> $d_{10} = 0.57$ | $n_5 = 1.51633$ | $\nu_5 = 64.1$ |
| $L_6$ { $r_{11} = -109.37$ <br> $r_{12} = 138.24$ | $d_{11} = 10.22$ <br> $d_{12} = 11.61$ | $n_6 = 1.80518$ | $\nu_6 = 25.4$ |
| $L_7$ { $r_{13} = -442.94$ <br> $r_{14} = -74.18$ | $d_{13} = 14.05$ <br> $d_{14} = 0.41$ | $n_7 = 1.51633$ | $\nu_7 = 64.1$ |
| $L_8$ { $r_{15} = 662.76$ <br> $r_{16} = -105.61$ | $d_{15} = 16.34$ | $n_8 = 1.51633$ | $\nu_8 = 64.1$ |

Backfocus = 163.389 = 1.63 F $$F_{1\cdot 2\cdot 3} = -68.333 = -\frac{F}{1.46}$$

$$F_{1\cdot 2\cdot 3\cdot 4} = -345.137 = -\frac{F}{0.29}$$

$$F_{1\cdot 2\cdot 3\cdot 4\cdot 5\cdot 6} = -111.143 = -\frac{F}{0.9}$$

$\overline{\nu} = 64.1$
$\Sigma_d = 175.64 = 1.76$ F
Petzval's sum = 0.159

EXAMPLE 3

| overall focal length F = 100 | aperture ratio 1 : 2.5 | viewing angle 85° | |
|---|---|---|---|
| radius of curvature | thickness or space | refractive index | Abbe number |
| $L_1$ { $r_1 = 316.47$ <br> $r_2 = 1393.72$ | $d_1 = 11.04$ <br> $d_2 = 0.41$ | $n_1 = 1.65844$ | $\nu_1 = 50.9$ |
| $L_2$ { $r_3 = 92.85$ <br> $r_4 = 46.25$ | $d_3 = 4.88$ <br> $d_4 = 22.90$ | $n_2 = 1.65844$ | $\nu_2 = 50.9$ |
| $L_3$ { $r_5 = 138.89$ <br> $r_6 = 47.03$ | $d_5 = 7.40$ <br> $d_6 = 14.92$ | $n_3 = 1.64000$ | $\nu_3 = 60.1$ |
| $L_4$ { $r_7 = 121.60$ <br> $r_8 = -336.11$ | $d_7 = 35.15$ <br> $d_8 = 13.02$ | $n_4 = 1.80518$ | $\nu_4 = 25.4$ |
| $L_5$ { $r_9 = 650.28$ <br> $r_{10} = -73.21$ | $d_9 = 16.78$ <br> $d_{10} = 0.57$ | $n_5 = 1.64000$ | $\nu_5 = 60.1$ |
| $L_6$ { $r_{11} = -105.18$ <br> $r_{12} = 138.91$ | $d_{11} = 9.64$ <br> $d_{12} = 10.46$ | $n_6 = 1.80518$ | $\nu_6 = 25.4$ |
| $L_7$ { $r_{13} = -434.58$ <br> $r_{14} = -80.36$ | $d_{13} = 14.61$ <br> $d_{14} = 0.41$ | $n_7 = 1.64000$ | $\nu_7 = 60.1$ |
| $L_8$ { $r_{15} = -640.54$ <br> $r_{16} = -115.37$ | $d_{15} = 14.12$ | $n_8 = 1.64000$ | $\nu_8 = 60.1$ |

Backfocus = 162.789 = 1.63 F $$F_{1\cdot 2\cdot 3} = -67.695 = -\frac{F}{1.48}$$

$$F_{1\cdot 2\cdot 3\cdot 4} = -359.596 = -\frac{F}{0.28}$$

$$F_{1\cdot 2\cdot 3\cdot 4\cdot 5\cdot 6} = -122.442 = -\frac{F}{0.82}$$

$\overline{\nu} = 54.0$
$\Sigma_d = 176.313 = 1.76$ F
Petzval's sum = 0.138

What is claimed is:

1. A retrofocus type wide angle photographic lens system comprising eight lens elements grouped into eight components, composed, in order from the object side, of a first lens $L_1$ being a positive lens, second and third lenses $L_2$, $L_3$ being negative meniscus lenses each having a convex surface directed to the object, fourth and fifth lenses $L_4$, $L_5$ being positive lenses, a sixth lens $L_6$ being a negative lens, seventh and eighth lenses $L_7$ and $L_8$ being positive lenses, a stop diaphragm disposed between said fourth and fifth lenses $L_4$ and $L_5$, and said lens system satisfying the following conditions:

| overall focal length F = 100 | aperture ratio 1:2.5 | viewing angle 85° | |
|---|---|---|---|
| radius of curvature | thickness or space | refractive index | Abbe number |
| $L_1$ { $r_1 = 276.34$ <br> $r_2 = 1748.71$ | $d_1 = 13.26$ <br> $d_2 = 0.41$ | $n_1 = 1.51633$ | $\nu_1 = 64.1$ |
| $L_2$ { $r_3 = 93.95$ <br> $r_4 = 42.38$ | $d_3 = 7.19$ <br> $d_4 = 22.69$ | $n_2 = 1.51112$ | $\nu_2 = 60.5$ |
| $L_3$ { $r_5 = 201.92$ <br> $r_6 = 42.00$ | $d_5 = 4.90$ <br> $d_6 = 14.98$ | $n_3 = 1.51454$ | $\nu_3 = 54.7$ |
| $L_4$ { $r_7 = 116.47$ <br> $r_8 = -208.58$ | $d_7$ <br> $d_8 = 34.93$ <br> $d_8 = 11.87$ | $n_4 = 1.74077$ | $\nu_4 = 27.8$ |
| $L_5$ { $r_9 = -1869.36$ <br> $r_{10} = -66.96$ | $d_9 = 16.04$ <br> $d_{10} = 0.57$ | $n_5 = 1.58913$ | $\nu_5 = 61.1$ |
| $L_6$ { $r_{11} = -118.34$ <br> $r_{12} = 139.95$ | $d_{11} = 10.88$ <br> $d_{12} = 9.64$ | $n_6 = 1.80518$ | $\nu_6 = 25.4$ |
| $L_7$ { $r_{13} = -360.80$ <br> $r_{14} = -66.60$ | $d_{13} = 14.03$ <br> $d_{14} = 0.41$ | $n_7 = 1.51633$ | $\nu_7 = 64.1$ |
| $L_8$ { $r_{15} = 402.67$ <br> $r_{16} = -157.14$ | $d_{15} = 13.08$ | $n_8 = 1.51633$ | $\nu_8 = 64.1$ |

Backfocus = 156.241 = 1.56 F,
Resultant Focal Length $$F_{1\cdot 2\cdot 3} = -67.422 = -\frac{F}{1.48},$$

$$F_{1\cdot 2\cdot 3\cdot 4} = -605.804 = -\frac{F}{0.17},$$

$$F_{1\cdot 2\cdot 3\cdot 4\cdot 5\cdot 6} = -133.808 = -\frac{F}{0.75},$$

Average Abbe Number for Lenses $L_1$, $L_2$ and $L_3$
$\overline{\nu} = 59.8$
Overall Length
$\Sigma_d = 174.87 = 1.75$ F, and
Petzval's sum = 0.151.

2. A retrofocus type wide angle photographic lens system comprising eight lens elements grouped into eight components, composed, in order from the object side, of a first lens $L_1$ being a positive lens, second and third lenses $L_2$, $L_3$ being negative meniscus lenses each having a convex surface directed to the object, fourth and fifth lenses $L_4$, $L_5$ being positive lenses, a sixth lens $L_6$ being a negative lens, seventh and eighth lenses $L_7$ and $L_8$ being positive lenses, a stop diaphragm disposed between said fourth and fifth lenses $L_4$ and $L_5$, and said lens system satisfying the following conditions:

| overall focal length F = 100 | aperture ratio 1 : 2.5 | | viewing angle 85° |
|---|---|---|---|
| radius of curvature | thickness or space | refractive index | Abbe number |
| $L_1$ { $r_1$ = 264.57 | $d_1$ = 15.21 | $n_1$ = 1.51633 | $\nu_1$ = 64.1 |
| $r_2$ = 2056.82 | | | |
| | $d_2$ = 0.41 | | |
| $L_2$ { $r_3$ = 92.90 | $d_3$ = 4.97 | $n_2$ = 1.51633 | $\nu_2$ = 64.1 |
| $r_4$ = 42.10 | | | |
| | $d_4$ = 22.37 | | |
| $L_3$ { $r_5$ = 157.49 | $d_5$ = 5.21 | $n_3$ = 1.51633 | $\nu_3$ = 64.1 |
| $r_6$ = 40.58 | | | |
| | $d_6$ = 14.59 | | |
| $L_4$ { $r_7$ = 125.82 | $d_7$ = 33.51 | $n_4$ = 1.80518 | $\nu_4$ = 25.8 |
| $r_8$ = −315.39 | | | |
| | $d_8$ = 11.17 | | |
| $L_5$ { $r_9$ = 2718.88 | $d_9$ = 15.01 | $n_5$ = 1.51633 | $\nu_5$ = 64.1 |
| $r_{10}$ = −58.89 | | | |
| | $d_{10}$ = 0.57 | | |
| $L_6$ { $r_{11}$ = −109.37 | $d_{11}$ = 10.22 | $n_6$ = 1.80518 | $\nu_6$ = 25.4 |
| $r_{12}$ = 138.24 | | | |
| | $d_{12}$ = 11.61 | | |
| $L_7$ { $r_{13}$ = −442.94 | $d_{13}$ = 14.05 | $n_7$ = 1.51633 | $\nu_7$ = 64.1 |
| $r_{14}$ = −74.18 | | | |
| | $d_{14}$ = 0.41 | | |
| $L_8$ { $r_{15}$ = 662.76 | $d_{15}$ = 16.34 | $n_8$ = 1.51633 | $\nu_8$ = 64.1 |
| $r_{16}$ = −105.61 | | | |

Backfocus = 163.389 = 1.63 F,
Resultant Focal Length $$F_{1\cdot 2\cdot 3} = -68.333 = -\frac{F}{1.46},$$

$$F_{1\cdot 2\cdot 3\cdot 4} = -345.137 = -\frac{F}{0.29},$$

$$F_{1\cdot 2\cdot 3\cdot 4\cdot 5\cdot 6} = -111.143 = -\frac{F}{0.9},$$

Average Abbe Number for Lenses $L_1$, $L_2$ and $L_3$
$\overline{\nu} = 64.1$
Overall Length
$\Sigma_d = 175.64 = 1.76$ F, and
Petzval's sum = 0.159.

3. A retrofocus type wide angle photographic lens system comprising eight lens elements grouped into eight components, composed, in order from the object side, of a first lens $L_1$ being a positive lens, second and third lenses $L_2$, $L_3$ being negative meniscus lenses each having a convex surface directed to the object, fourth and fifth lenses $L_4$, $L_5$ being positive lenses, a sixth lens $L_6$ being a negative lens, seventh and eighth lenses $L_7$ and $L_8$ being positive lenses, a stop diaphragm disposed between said fourth and fifth lenses $L_4$ and $L_5$, and said lens system satisfying the following conditions:

| overall focal length F = 100 | aperture ratio 1 : 2.5 | | viewing angle 85° |
|---|---|---|---|
| radius of curvature | thickness or space | refractive index | Abbe number |
| $L_1$ { $r_1$ = 316.47 | $d_1$ = 11.04 | $n_1$ = 1.65844 | $\nu_1$ = 50.9 |
| $r_2$ = 1393.72 | | | |
| | $d_2$ = 0.41 | | |
| $L_2$ { $r_3$ = 92.85 | $d_3$ = 4.88 | $n_2$ = 1.65844 | $\nu_2$ = 50.9 |
| $r_4$ = 46.25 | | | |
| | $d_4$ = 22.90 | | |
| $L_3$ { $r_5$ = 138.89 | $d_5$ = 7.40 | $n_3$ = 1.64000 | $\nu_3$ = 60.1 |
| $r_6$ = 47.03 | | | |
| | $d_6$ = 14.92 | | |
| $L_4$ { $r_7$ = 121.60 | $d_7$ = 35.15 | $n_4$ = 1.80518 | $\nu_4$ = 25.4 |
| $r_8$ = −336.11 | | | |
| | $d_8$ = 13.02 | | |
| $L_5$ { $r_9$ = 650.28 | $d_9$ = 16.78 | $n_5$ = 1.64000 | $\nu_5$ = 60.1 |
| $r_{10}$ = −73.21 | | | |
| | $d_{10}$ = 0.57 | | |
| $L_6$ { $r_{11}$ = −105.18 | $d_{11}$ = 9.64 | $n_6$ = 1.80518 | $\nu_6$ = 25.4 |
| $r_{12}$ = 138.91 | | | |
| | $d_{12}$ = 10.46 | | |
| $L_7$ { $r_{13}$ = −434.58 | $d_{13}$ = 14.61 | $n_7$ = 1.64000 | $\nu_7$ = 60.1 |
| $r_{14}$ = −80.36 | | | |
| | $d_{14}$ = 0.41 | | |
| $L_8$ { $r_{15}$ = −640.54 | $d_{15}$ = 14.12 | $n_8$ = 1.64000 | $\nu_8$ = 60.1 |
| $r_{16}$ = −115.37 | | | |

Backfocus = 162.789 = 1.63 F,
Resultant Rocal Length $$F_{1\cdot 2\cdot 3} = -67.695 = -\frac{F}{1.48},$$

$$F_{1\cdot 2\cdot 3\cdot 4} = -359.596 = -\frac{F}{0.28},$$

$$F_{1\cdot 2\cdot 3\cdot 4\cdot 5\cdot 6} = -122.442 = -\frac{F}{0.82},$$

Average Abbe Number for Lenses $L_1$, $L_2$ and $L_3$
$\overline{\nu} = 54.0$,
Overall Length
$\Sigma_d = 176.313 = 1.76$ F, and
Petzval's sum = 0.138.

* * * * *